(12) United States Patent
Hughes et al.

(10) Patent No.: US 11,860,010 B2
(45) Date of Patent: Jan. 2, 2024

(54) DIFFERENTIAL PRESSURE METERING APPARATUS FOR A FLOW RESTRICTOR PIPE SECTION

(71) Applicant: Spirax-Sarco Limited, Cheltenham (GB)

(72) Inventors: Adam Hughes, Cheltenham (GB); Martin Folkesson, Cheltenham (GB)

(73) Assignee: Spirax-Sarco Limited, Cheltenham (GB)

( * ) Notice: Subject to any disclaimer, the term of this patent is extended or adjusted under 35 U.S.C. 154(b) by 196 days.

(21) Appl. No.: 17/292,214

(22) PCT Filed: Nov. 8, 2019

(86) PCT No.: PCT/EP2019/080725
§ 371 (c)(1),
(2) Date: May 7, 2021

(87) PCT Pub. No.: WO2020/094856
PCT Pub. Date: May 14, 2020

(65) Prior Publication Data
US 2022/0003583 A1  Jan. 6, 2022

(30) Foreign Application Priority Data
Nov. 9, 2018 (GB) ...................................... 1818258

(51) Int. Cl.
*G01F 1/36* (2006.01)
*G01F 15/00* (2006.01)
(52) U.S. Cl.
CPC .............. *G01F 1/36* (2013.01); *G01F 15/005* (2013.01)

(58) Field of Classification Search
None
See application file for complete search history.

(56) References Cited

U.S. PATENT DOCUMENTS

2011/0146415 A1* 6/2011 Tabaru .................... G01F 1/363
 73/861.42
2013/0098469 A1 4/2013 Deegan et al.

FOREIGN PATENT DOCUMENTS

CN 207600542 U 7/2018
WO 2016/099968 A1 6/2016

OTHER PUBLICATIONS

May 10, 2019—(GB) UK Search Report—App. No. 1818258.4.
(Continued)

*Primary Examiner* — Harshad R Patel
(74) *Attorney, Agent, or Firm* — Banner & Witcoff, Ltd.

(57) ABSTRACT

A differential pressure metering apparatus includes a manifold for fluidically coupling impulse lines. The manifold also includes a rigid body having a base, and an arm extending from the base, with a high and low pressure channel extending through the body from a high pressure inlet to opposing first and second high pressure outlet ports, and from a low pressure inlet to opposing first and second low pressure outlet ports respectively. The manifold is configured to be mounted to a flow restrictor pipe section in a wet-line configuration, in which the first high and low pressure outlet ports define impulse line extension directions having a downward component, and the second high and low pressure outlet ports define impulse line extension directions having an upward component.

17 Claims, 5 Drawing Sheets

(56) References Cited

OTHER PUBLICATIONS

Feb. 27, 2020—(WO) International Search Report & Written Opinion—App. No. PCT/EP2019/080725.
"Gilflo ILVA and Gilflo ILVA with Mass Flow Transmitter and Compact Stem Flowmetering Systems Installation and Maintenance Instructions" IM-P337-04, MI Issue 12 (2012).

* cited by examiner

DIFFERENTIAL PRESSURE METERING APPARATUS FOR A FLOW RESTRICTOR PIPE SECTION

CROSS-REFERENCE TO RELATED APPLICATIONS

This application is a U.S. National Stage Application under 35 U.S.C. § 371 of International Application No. PCT/EP2019/080725, filed Nov. 8, 2019, which claims the benefit of priority to United Kingdom Application No. GB 1818258.4, filed Nov. 9, 2018, and the present application claims the benefit of the filing date of both of these prior applications, which are incorporated by reference herein in their entireties.

FIELD

The present invention relates to a differential pressure metering apparatus comprising a manifold for fluidically coupling impulse lines for a differential pressure meter to measurement ports of a flow restrictor pipe section.

BACKGROUND

Differential pressure metering apparatus or systems are commonly used to measure the flow rate of a flow within a pipe by providing a restriction in the flow path and measuring the pressure drop across the restriction, which is proportional to the square of the flow rate. In use, a flow restrictor is placed in a pipe and a pair of impulse lines are fluidically connected to a differential pressure meter at one end and are fluidically connected to the flow before and after the restriction respectively at the other end. The apparatus is typically assembled on site.

BRIEF SUMMARY

According to an aspect, there is provided a differential pressure metering apparatus comprising a manifold for fluidically coupling impulse lines for a differential pressure meter to measurement ports of a flow restrictor pipe section, the manifold comprising: a rigid body comprising a base for mounting to a flow restrictor pipe section, and an arm extending from the base to an impulse attachment portion for coupling to two impulse lines; a high pressure channel extending through the rigid body from a high pressure inlet to a high pressure outlet T-junction in the impulse attachment portion, the high pressure outlet T-junction having opposing first and second high pressure outlet ports each defining an impulse line extension direction along which an impulse line extends when connected to the respective port; a low pressure channel extending through the rigid body from a low pressure inlet to a low pressure outlet T-junction in the impulse attachment portion, the low pressure outlet T-junction having opposing first and second low pressure outlet ports each defining an impulse line extension direction along which an impulse line extends when connected to the respective port; whereby the manifold is configured to be individually mounted to flow restrictor pipe sections having respective longitudinal pipe axes extending horizontally and vertically in at least one wet-line configuration, in which the first high pressure outlet port and the first low pressure outlet port define impulse line extension directions having a downward component, and the second high pressure outlet port and the second low pressure outlet port define impulse line extension directions having an upward component.

The outlet ports are each configured to couple to an impulse line so that the impulse line extends from the port along an impulse line extension direction defined by the port.

According to another aspect, there is provided a differential pressure metering apparatus comprising a manifold for fluidically coupling impulse lines for a differential pressure meter to measurement ports of a flow restrictor pipe section, the manifold comprising: a rigid body comprising a base for mounting to a flow restrictor pipe section, and an arm extending from the base to an impulse attachment portion for coupling to two impulse lines; a high pressure channel extending through the rigid body from a high pressure inlet port to a high pressure outlet T-junction in the impulse attachment portion, the high pressure outlet T-junction having opposing first and second high pressure outlet ports each defining an impulse line extension direction along which an impulse line extends when connected to the respective port; a low pressure channel extending through the rigid body from a low pressure inlet port to a low pressure outlet T-junction in the impulse attachment portion, the low pressure outlet T-junction having opposing first and second low pressure outlet ports each defining an impulse line extension direction along which an impulse line extends when connected to the respective port; whereby the manifold is configured to be mounted to a flow restrictor pipe section in a wet-line configuration: when the longitudinal pipe axis of the flow restrictor pipe section extends horizontally; and when the longitudinal pipe axis of the flow restrictor pipe section extends vertically; wherein in the wet-line configuration, the first high pressure outlet port and the first low pressure outlet port define impulse line extension directions having a downward component, and the second high pressure outlet port and the second low pressure outlet port define impulse line extension directions having an upward component.

In other words, the same manifold can be mounted to a flow restrictor pipe section in a wet-line configuration as claimed, both when the longitudinal axis of the flow restrictor pipe section extends horizontally, and when it extends vertically.

Accordingly, the manifold is configured so that if the flow restrictor pipe section were inverted to monitor flow along the same longitudinal pipe axis in the opposite direction, the manifold can be rotated to maintain correspondence between the high pressure channel of the manifold and a high pressure measurement port of the flow restrictor pipe section, whilst continuing to provide a high pressure outlet port and a low pressure outlet port having downwardly-inclined impulse line extension directions. Therefore, the same manifold can be used with opposing installation orientations of the flow restrictor pipe section. Further, since the correspondence between the high pressure inlet port of the manifold and the high pressure measurement port of the flow restrictor pipe section is maintained, the manifold can be permanently labelled to indicate high and low pressure inlet ports and outlet ports of the manifold, thereby making it easier to set up a differential pressure metering apparatus or adapt a differential pressure metering apparatus for a different pipe.

In the wet-line configuration, one of the high pressure outlet ports and one of the low pressure outlet ports may each define a respective impulse line extension direction which is below the horizontal by at least 10 degrees.

The manifold may be configured so that, when mounted in the wet-line configuration to a flow restrictor pipe section having a longitudinal axis extending horizontally, one of the high pressure outlet ports and one of the low pressure outlet ports each define a respective impulse line extension direction which is below the horizontal by at least 45 degrees, for example up to 75 degrees or up to 80 degrees.

The manifold may be configured so that the high pressure inlet port and the low pressure inlet port are spaced apart along a manifold axis. The manifold may be configured so that one of the high pressure outlet ports and one of the low pressure outlet ports each define a respective impulse line extension direction which is below the horizontal by at least 10 degrees when the manifold axis is horizontal or vertical.

The other of the high pressure outlet port and low pressure outlet port may define an impulse line extension direction which is above the horizontal by at least 10 degrees when the longitudinal manifold axis is horizontal or vertical.

The manifold may comprise isolation valves which are respectively configured to selectively isolate the high pressure outlet T-junction from the high pressure inlet port, and to selectively isolate the low pressure outlet T-junction from the low pressure inlet port.

The first high pressure and first low pressure outlet ports may be side-by-side so that the impulse line extension directions of the first high pressure outlet port and the first low pressure outlet port are parallel to one another. The second high pressure and second low pressure outlet ports may be side-by-side so that the impulse line extension directions of the second high pressure outlet port and the second low pressure outlet port are parallel to one another.

Each channel may have an end portion extending from the isolation valve to the T-junction, wherein the two end portions approach the respective T-junctions from opposing sides.

The manifold may be configured so that when it is mounted to a flow restrictor pipe section in a first installation orientation in which the flow restrictor pipe section has a horizontal or vertical longitudinal pipe axis and the first high pressure outlet port and the first low pressure outlet port define impulse line extension directions having a downward component, rotation of both the flow restrictor pipe section and the manifold together about a horizontally extending radial axis of the flow restrictor pipe section by 180 degrees to a second installation orientation causes the second high pressure outlet port and the second low pressure outlet port to define impulse line extension directions having a downward component.

The high pressure outlet ports and the low pressure outlet ports may be threaded.

The pressure metering apparatus may comprise plugs configured to close one of the high pressure outlet ports and one of the low pressure outlet ports respectively.

The manifold may be configured to be mounted in a dry-line configuration to a flow restrictor pipe section having a horizontal longitudinal pipe axis, such that the impulse line extension directions defined by each of the first and second sets of high pressure and low pressure outlet ports have an upward component.

The angular offset may be in at least 5 degrees when projected onto a radial plane intersecting the longitudinal pipe axis and the respective T-junction or outlet port. Accordingly, when the manifold extends radially vertically upwardly, each of the first and second sets of high pressure and low pressure outlet ports have an upward component.

Each of the outlet ports may be configured so that, when the apparatus is coupled to a flow restrictor pipe section in a dry-line configuration, the respective impulse line extension direction is angularly offset relative the longitudinal pipe axis by at least 5 degrees away from the pipe.

The differential pressure metering apparatus may comprise a flow restrictor pipe section comprising a high pressure measurement port and a low pressure measurement port upstream and downstream of a flow restrictor respectively, the flow restrictor pipe section defining a longitudinal pipe axis. The manifold may be configured to be mounted to the flow restrictor pipe section so that the high pressure inlet port is fluidically coupled to the high pressure measurement port and the low pressure inlet port is fluidically coupled to the low pressure measurement port. The flow restrictor pipe section and the manifold may be configured so that when the longitudinal pipe axis is horizontal or vertical, the manifold is mountable in at least one wet-line configuration in which the first high pressure outlet port and the first low pressure outlet port define impulse line extension directions having a downward component, and the second high pressure outlet port and the second low pressure outlet port define impulse line extension directions having an upward component The manifold may be configured to be mounted to the flow restrictor pipe section in a wet-line configuration both when the longitudinal pipe axis extends horizontally and when the longitudinal pipe axis extends vertically. In the wet-line configuration, the first high pressure outlet port and the first low pressure outlet port may define impulse line extension directions having a downward component, and the second high pressure outlet port and the second low pressure outlet port may define impulse line extension directions having an upward component.

DESCRIPTION OF THE DRAWINGS

Embodiments of the invention will now be described, by way of example only, with reference to the accompanying Figures, in which.

DETAILED DESCRIPTION

Figure 1:
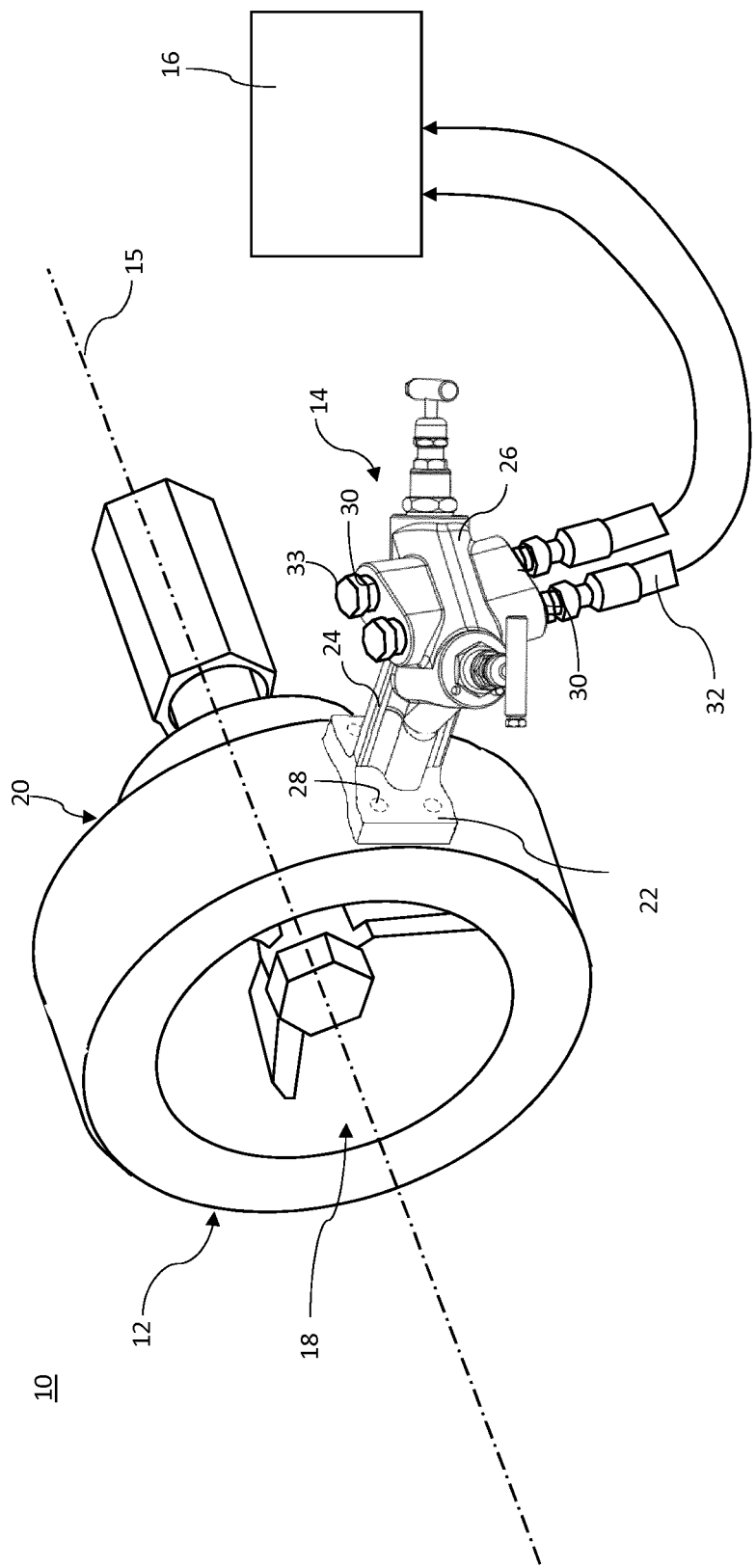
FIG. 1 shows a differential pressure metering apparatus having a horizontal flow restrictor pipe section and manifold in a wet-line configuration.

FIG. 1 shows an assembled differential pressure metering apparatus 10 having a flow restrictor pipe section 12, a manifold 14 mounted to the flow restrictor pipe section 12, a pressure meter 16 and two impulse lines 32 for fluidically connecting the manifold 14 to the pressure meter 16.

The flow restrictor pipe section 12 is configured to be placed between two lengths of pipe (not shown) and is configured to accommodate a fluid flow so that the flow through the pipe travels through the flow restrictor pipe section 12.

The pressure metering apparatus 10 may be configured to monitor the pressure of a high temperature fluid flow in a pipe such as steam (e.g. saturated steam at 10 bar gauge), or a low temperature fluid flow in a pipe such as low temperature air (e.g. 50 degrees centigrade air at atmospheric pressure).

When the pressure metering apparatus 10 is used to monitor a high temperature fluid flow (e.g. a fluid flow having a temperature of at least 80 degrees), the pressure metering apparatus 10 is arranged in a wet-line configuration. In the wet-line configuration, the impulse lines 32 fluidically connecting the manifold 14 with the pressure meter device 16 are filled with liquid water, and the manifold 14 is mounted to the flow restrictor pipe section 12 in such a way as to retain the water in the impulse lines 32. The water acts as a buffer between the hot fluid flow in the pipe and the pressure meter device 16 since it can only reach a saturation temperature as a maximum, whereas the hot fluid flow may otherwise damage the pressure meter device 16.

When the pressure metering apparatus 10 is used to monitor a low temperature gas (e.g. a gas having a temperature of less than 80 degrees), the pressure metering apparatus 10 may be arranged in a dry-line configuration, in which the impulse lines 32 are not filled with water, but are coupled to the manifold 14 at an angle so that condensate in the impulse lines 32 can drain from the impulse lines 32, back into the manifold 14.

The flow restrictor pipe section 12 has a longitudinal axis 15 and comprises an upstream circular opening 18 and a profiled cone restriction 20 having a diameter which decreases along the longitudinal axis 15. The profiled cone 20 has a downstream opening (not shown) with a smaller diameter than the upstream opening 18. In use, the flow restrictor pipe section 12 is therefore configured to funnel a flow from a pipe through the upstream opening 18 and into a restriction before releasing it back into the pipe through the downstream opening. In other examples, this may be achieved with a simple orifice plate, or other type of flow restrictor.

In this example, the flow restrictor pipe section 12 is shown in a horizontal orientation in which the longitudinal axis 15 extends in a horizontal direction (i.e. is horizontal). The flow restrictor pipe section 12 is in a horizontal orientation in use, when mounted in a horizontal pipe.

The manifold 14 comprises a rigid body having a base 22 and an arm 24 extending from the base 22 to an impulse attachment portion 26. The base 22 is configured to lie against the flow restrictor pipe section 12 and in this example comprises four bolt holes 28 for fixing the manifold 14 to the flow restrictor pipe section 12 with bolts. In other examples, the manifold may be fixed to the flow restrictor pipe by any suitable means, such as with screws or an adhesive.

In a wet-line configuration with the flow restrictor pipe section 12 in a horizontal orientation, the manifold 14 is mounted to the flow restrictor pipe section 12 so that the arm 24 of the manifold 14 extends horizontally from the flow restrictor pipe section 12 along a radial direction with respect to the flow restrictor pipe section 12.

The impulse attachment portion 26 of the manifold 14 comprises four outlet ports 30 which will be described in more detail below. The outlet ports 30 are configured for coupling to the two impulse lines 32 or to plugs 33. In this example, the outlet ports 30 are threaded to engage the impulse lines 32 or plugs 33 securely.

The impulse lines 32 in this example are flexible lines which, as shown in FIG. 1 are respectively connected to two outlet ports 30, and to the pressure meter device 16 at opposing ends to fluidically connect the outlet ports 30 of the manifold 14 to the pressure meter device 16.

Figure 2:
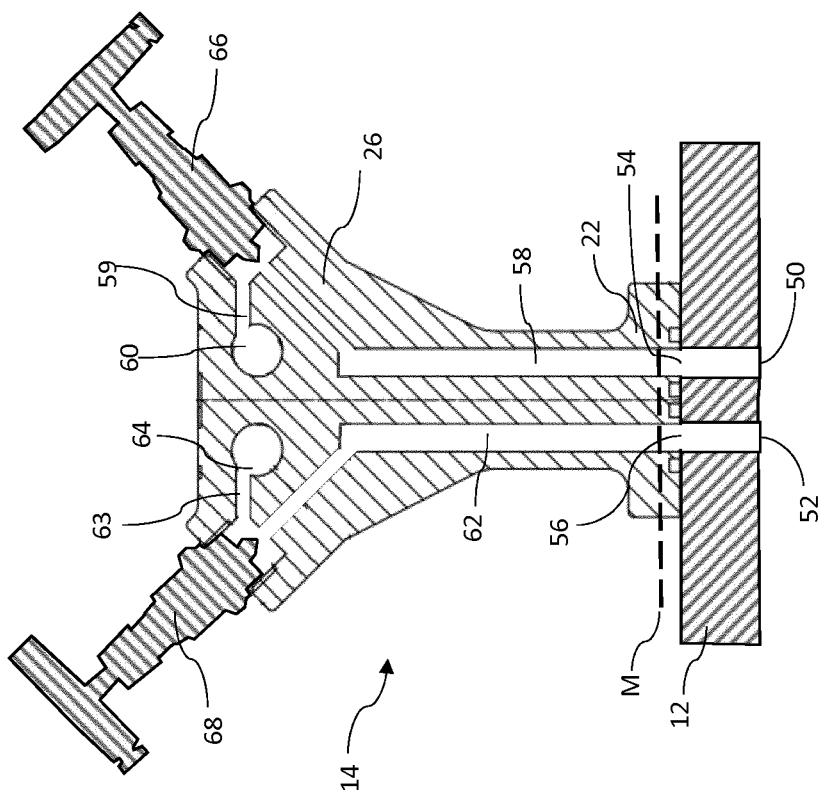
FIG. 2 shows a cross sectional top view of the manifold.
Figure 3:
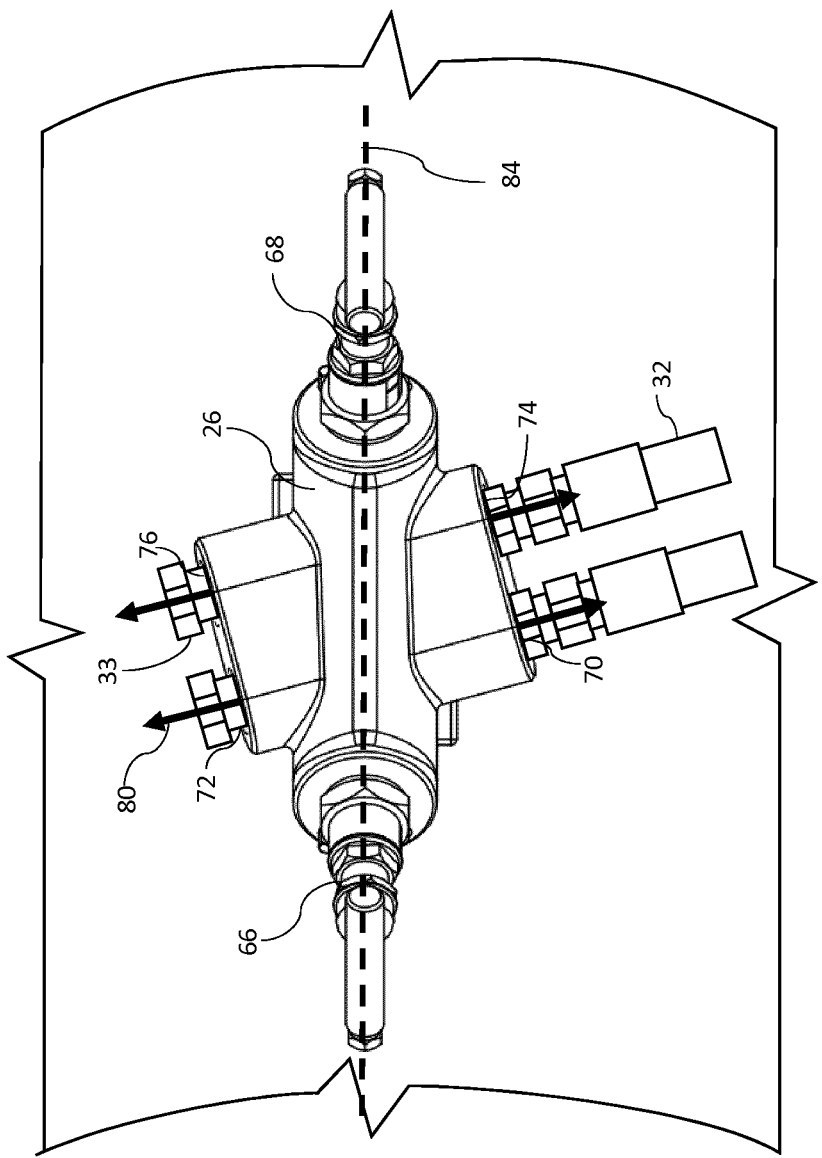
FIG. 3 shows a front view of the flow restrictor pipe section and manifold in FIG. 1.

FIG. 2 shows a cross-sectional top view of the manifold 14 mounted to the horizontal flow restrictor pipe section 12 in a wet-line configuration and FIG. 3 shows a front view of the manifold 14 fixed to the restrictor pipe section 12 in the wet-line configuration.

The flow restrictor pipe section 12 comprises a high pressure measurement port 50 and a low pressure measurement port 52 which are configured to be fluidically connected to a flow on a high pressure side (upstream) and a low pressure side (downstream) of the profiled cone restriction 20 respectively.

The manifold 14 comprises a high pressure channel 58 extending through the rigid body from a high pressure inlet port 54 in the base 22 to a high pressure outlet T-junction 60 in the impulse attachment portion 26. The manifold 14 also comprises a low pressure channel 62 extending through the rigid body from a low pressure inlet port 56 in the base 22 to a low-pressure outlet T-junction 64 in the impulse attachment portion 26.

The high pressure channel 58 and low pressure channel 62 are fluidically connected to the high pressure measurement port 50 and low pressure measurement port 52 of the flow restrictor pipe section 12 respectively.

The high pressure inlet port 54 and the low pressure inlet port 56 are spaced apart on the manifold 14 along a longitudinal manifold axis M. In this example, the manifold 14 is mounted to the flow restrictor pipe section 12 so that the longitudinal manifold axis M is parallel to the longitudinal axis 15 of the flow restrictor pipe section 12 (i.e. the longitudinal manifold axis M is horizontal). In other examples, the manifold may be fixed to the flow restrictor pipe section so that the longitudinal manifold axis M is not parallel to the longitudinal axis of the flow restrictor pipe section.

The manifold 14 further comprises a first isolation valve 66 which is configured to selectively isolate the high pressure outlet T-junction 60 from the high pressure inlet port 54, and a second isolation valve 68 which is configured to selectively isolate the low pressure outlet T-junction 64 from the low pressure inlet port 56.

The body of the manifold 14 widens towards the impulse attachment portion 26 so that the channels 58, 62 extend laterally away from one another to the isolation valves 66, 68, and then laterally inwardly towards each other to the respective outlet T-junctions 60, 64. This provides a particularly compact arrangement which permits easy access to the isolation valves 66, 68.

The high pressure channel 58 has an end portion 59 extending from the isolation valve 66 to the high pressure outlet T-junction 60, and the low pressure channel has an end portion 63 extending from the isolation valve 68 to the low pressure outlet T-junction 64. The two end portions 59, 63 approach the respective T-junctions 60, 64 from opposing sides.

The high pressure outlet T-junction 60 has a pair of opposing outlet ports 30: a first high pressure outlet port 70 and a second high pressure outlet port 72 opposing the first high pressure outlet port 70. The low pressure outlet T-junction 64 has a pair of opposing outlet ports 30: a first low pressure outlet port 74 and a second low pressure outlet port 76 opposing the first low pressure outlet port 74. The first low pressure outlet port 74 and the first high pressure outlet port 70 are disposed side-by-side in the impulse attachment portion 26 such that they are parallel, and the second low pressure outlet port 76 and the second high pressure outlet port 72 are also disposed side-by-side in the impulse attachment portion 26 such that they are parallel.

In this example, the channel lengths between the high pressure inlet port 5 and first high pressure outlet port 70 and between the low pressure inlet port 56 and first low pressure outlet port 74 are equal. In this example, the channel lengths between the high pressure inlet port 54 and second high pressure outlet port 72 and between the low pressure inlet port 56 and second low pressure outlet port 76 are also equal. This ensures that any pressure loss between the measurement port and the respective outlet port is substantially equal for both the high pressure channel and low pressure channel, so that the pressure differential can be accurately measured.

Each outlet port 70, 72, 74 and 76 (70-76) defines an impulse line extension direction 80 along which an impulse line 32 extends when connected to the respective outlet port 70-76. In this example, the impulse line extension directions 80 from the first high pressure outlet port 70 and the first low pressure outlet port 74 are parallel, and the impulse line extension directions 80 from the second high pressure outlet port 72 and the second low pressure outlet port 76 are parallel. However, in other examples, the impulse line extension directions may not be parallel to any other impulse line extension directions.

The first high pressure outlet port 70 and the first low pressure outlet port 74 each define respective impulse line extension directions 80 which are 75 degrees below a horizontal plane 84 (i.e. the impulse line extension directions 80 have a downward component) with the manifold 14 installed on the horizontally-extending flow restrictor pipe section 12. In this example, the impulse lines 32 are connected to the first high pressure outlet port 70 and first low pressure outlet port 74 respectively such that they extend in a direction which is 75 degrees below the horizontal plane 84. In other words, the impulse line extension directions 80 are offset from the longitudinal manifold axis M by 75 degrees so that when the manifold longitudinal axis M is horizontal, the impulse line extension directions 80 are 75 degrees above or below the horizontal.

After connecting the impulse lines 32 they are filled with liquid water through the second high pressure and low pressure outlet ports 72, 76.

The second high pressure outlet port 72 and the second low pressure outlet port 76 each define respective impulse line extension directions 80 which are 75 degrees above the horizontal plane 84 (i.e. the impulse line extension directions 80 have an upward component). Two plugs 33 are connected to the second high pressure outlet port 72 and second low pressure outlet port 76 respectively after filling to close these ports.

Connecting the impulse lines 32 to the first high pressure outlet port 70 and the first low pressure outlet port 74 which are angled at 75 degrees below the horizontal ensures that the water buffer in the impulse lines 32 (in the wet-line configuration) remains in place to protect the pressure meter device 16 from temperature damage.

The pressure metering apparatus 10 in the orientation as described above may also be used in a dry-line configuration in which the impulse lines 32 are connected to the second high pressure outlet port 72 and second low pressure outlet port 76 respectively (such that they extend from the manifold at 75 degrees above the horizontal plane 84) and in which the plugs 33 are connected to the first high pressure outlet port 70 and first low pressure outlet port 74 respectively.

In other examples, the arm of the manifold may extend from the flow restrictor pipe section in a different direction to the horizontal radial direction and there may still be at least one set of outlet ports having a downward component.

The flow restrictor pipe section 12 can be inverted (i.e. rotated by 180 degrees about a horizontal and radial line perpendicular to the longitudinal axis 15) so as to be used to monitor a fluid flowing along the same longitudinal axis in the opposite direction. The manifold 14 may also be rotated to maintain correspondence between both the high pressure channel 58 with the high pressure measurement port 50 and the low pressure channel 62 with the low pressure measurement port 52 so that the second high pressure outlet port 72 and second low pressure outlet port 76 have impulse line extension directions which are 75 degrees below the horizontal plane 84. In this example, in a wet-line configuration, the impulse lines 32 may be connected to the second high pressure outlet port 72 and the second low pressure outlet port 76 and the plugs 33 may be connected to the first high pressure outlet port 70 and the first low pressure outlet port 74. In this orientation, a dry-line configuration may be adopted by connecting the impulse lines 32 to the first high pressure outlet port 70 and the first low pressure outlet port 74 and connecting the plugs 33 to the second high pressure outlet port 72 and the second low pressure outlet port 76.

Since the correspondence between the high pressure inlet port 54 of the manifold 14 and the high pressure measurement port 50 of the flow restrictor pipe section 12 is maintained for use in either a wet-line configuration or a dry-line configuration, the manifold 14 can be permanently labelled to indicate high and low pressure inlet ports and outlet ports of the manifold 14, thereby making it easier to set up a differential pressure metering apparatus 10 or adapt a differential pressure metering apparatus 10 for a different pipe or different fluid flow.

Figure 4:
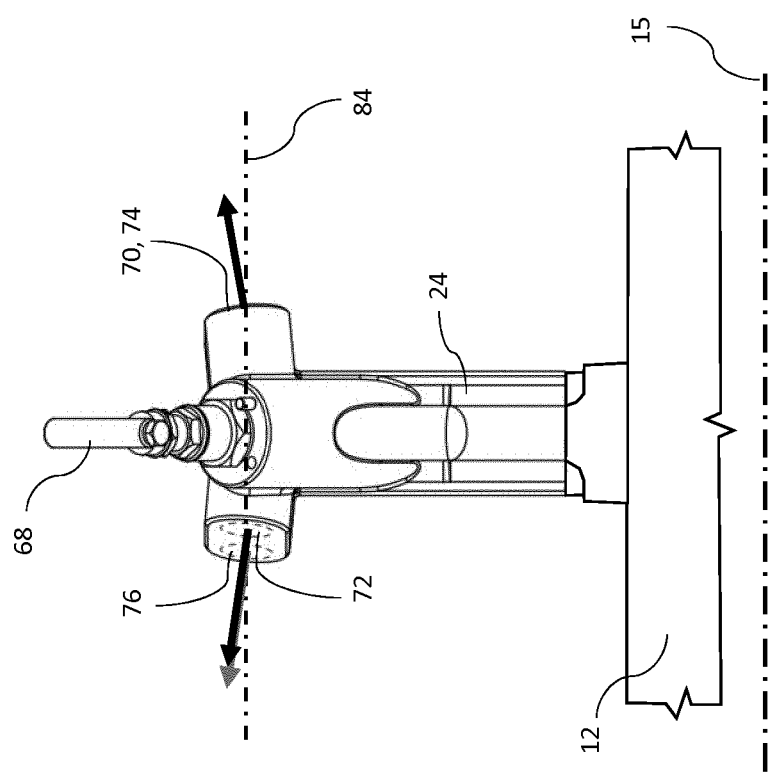
FIG. 4 shows a side view of a horizontal flow restrictor pipe section and the manifold in a dry-line configuration.

FIG. 4 shows the manifold 14 and flow restrictor pipe section 12 in an alternative dry-line configuration in which the longitudinal axis 15 of the flow restrictor pipe section 12 is horizontal, and the manifold 14 is fixed to the flow restrictor pipe section 12 such that the arm 24 of the manifold 14 extends vertically upwardly from the flow restrictor pipe section 12 along a radial direction of the flow restrictor pipe section 12.

The manifold 14 is configured such that, when fixed to the flow restrictor pipe section 12, each of the impulse line extension directions 80 is angularly offset relative the longitudinal pipe axis 15 of the flow restrictor pipe section 12 by 5 degrees away from the flow restrictor pipe section 12 (i.e. in a plane intersecting both the longitudinal pipe axis 15 and the impulse attachment portion 26 or respective outlet T-junction 60, 64). Therefore, when the manifold 14 and flow restrictor pipe section 12 are in this orientation, the impulse line extension directions 80 are 5 degrees above a horizontal plane 84.

Impulse lines 32 may therefore be connected to either of the first high and low pressure outlet ports 70, 74 or the second high and low pressure outlet ports 72, 76 such that the impulse lines 32 will extend in a direction having an upwards component away from the impulse attachment portion 26.

Figure 5:
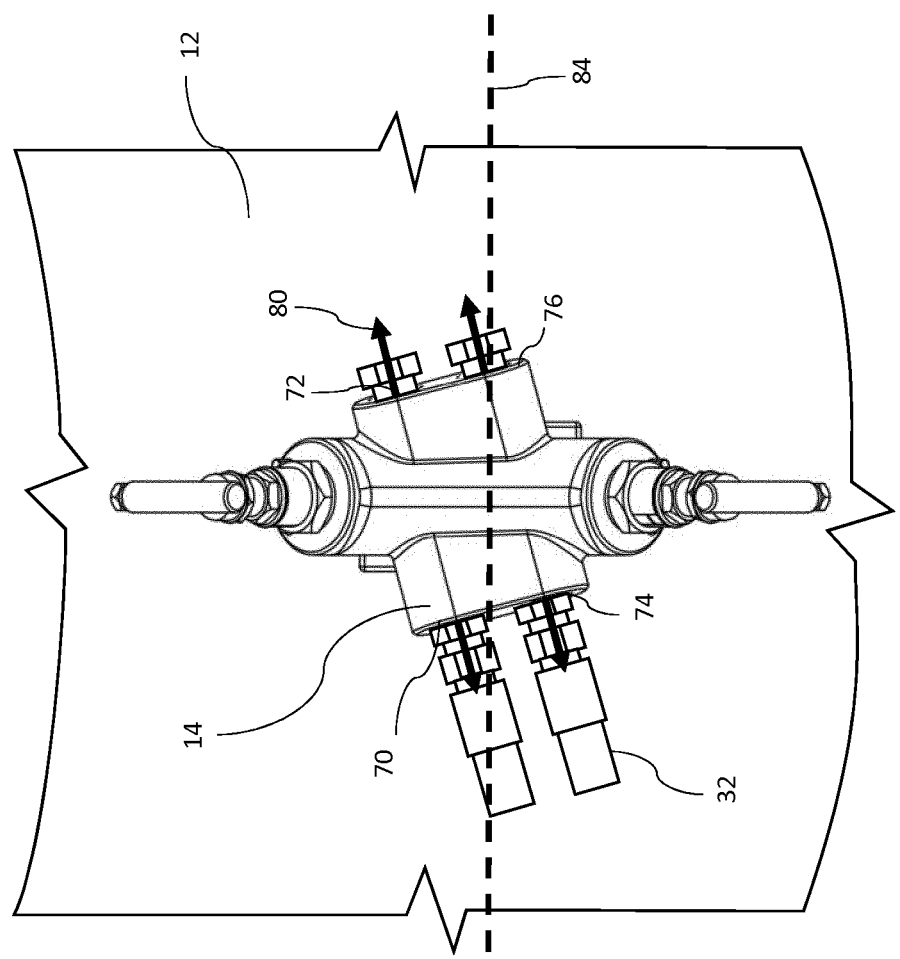
FIG. 5 shows a front view of a manifold mounted to a vertical flow restrictor pipe section.

FIG. 5 shows a front view of the flow restrictor pipe section 12 in a vertical orientation (i.e. the longitudinal axis 15 is in the vertical direction). The flow restrictor pipe section 12 is in a vertical orientation in use, when it is mounted in a vertical pipe.

In this example, the manifold 14 is mounted to the flow restrictor pipe section 12 in the same manner as it is mounted in FIGS. 1-3 (i.e. such that the longitudinal manifold axis M is vertical, parallel to the longitudinal axis 15 of the flow restrictor pipe section 12).

FIG. 5 shows the apparatus 10 in a wet-line configuration in which the impulse lines 32 are connected to the first high pressure outlet port 70 and the first low pressure outlet port 74 which each have impulse line extension directions 80 which are 15 degrees below a horizontal plane 84. Plugs 33 are connected to the second high pressure outlet port 72 and the second low pressure outlet port 76.

The impulse line extension directions 80 of the second high pressure outlet port 72 and the second low pressure outlet port 76 are 15 degrees above the horizontal plane 84. Therefore, the apparatus 10 can also be used in a dry-line configuration by connecting the impulse lines 32 to the second high pressure outlet port 72 and second low pressure outlet port 76 respectively, and by connecting plugs 33 to the first high pressure outlet port 70 and the first low pressure outlet port 74.

The apparatus 10 comprising the manifold 14 is versatile for use with a pipe in at least a horizontal and vertical orientation, and for fluid flow in any direction. As explained above, the manifold 14 can be permanently marked to show which of the outlet and inlet ports is for high pressure flow and which of the outlet ports and inlet ports is for low pressure flow. This can make connection of the impulse lines 32 to the correct outlet ports 30 much easier.

In setting up the pressure metering apparatus 10 for use, the manifold 14 may be fixed to the flow restrictor pipe section 12 before the flow restrictor pipe section 12 is positioned in a pipe. If the flow restrictor pipe section 12 is to be horizontal, it may be rotated by 180 degrees about a radial axis through the manifold 14, and/or or it may be rotated by 180 degrees about the longitudinal axis to adapt to different orientations as described above, whilst maintaining correspondence between both the high pressure channel 58 with the high pressure measurement port 50 and the low pressure channel 62 with the low pressure measurement port 52.

In any of these orientations, either the impulse line extension directions 80 of the first high pressure outlet port 70 and the first low pressure outlet port 74 are 75 degrees below the horizontal, or the impulse line extension directions 80 of the second high pressure outlet port 72 and the second low pressure outlet port 76 are 75 degrees below the horizontal, such that the apparatus 10 can be used in a wet-line configuration in multiple orientations due to the opposing outlet ports 30 which are offset at an angle from the horizontal.

Further, in any of those orientations, either the impulse line extension directions 80 of the first high pressure outlet port 70 and the first low pressure outlet port 74 are 75 degrees above the horizontal, or the impulse line extension directions 80 of the second high pressure outlet port 72 and the second low pressure outlet port 76 are 75 degrees above the horizontal, such that the apparatus 10 can alternatively be used in a dry-line configuration.

The pressure metering apparatus 10 may also be used in the dry-line configuration with the flow restrictor pipe section 12 in the horizontal orientation by rotating the flow restrictor pipe section 12 by 90 degrees about the longitudinal axis 15 from a wet-line configuration and moving the manifold 14 to maintain correspondence between the measurement ports 50, 52 of the flow restrictor pipe section 12 and the inlets ports 54, 56 of the manifold 14. This is due to the angle of the impulse line extension directions 80 away from the base 22 of the manifold 14 and the longitudinal axis of the pipe. Although it has been described in this example that the angle of the impulse line extension directions 80 is 5 degrees away from the base of the manifold 14 and the longitudinal axis of the pipe, in other examples, the angle may be more than 5 degrees.

The apparatus 10 may also be used for monitoring a fluid flow in a vertical pipe, by rotating the flow restrictor pipe section 12 by 90 degrees about a radial axis through the manifold 14 whilst maintaining the correspondence of the inlet ports 54, 56 of the manifold 14 with the measurement ports 50, 52 of the flow restrictor pipe section 12. Since the impulse extension directions 80 are offset from a horizontal plane when fixed to either a horizontal or a vertical flow restrictor pipe section 12, the apparatus 10 can still be used in either of the wet-line or dry-line configuration as explained above.

Although it has been described that in the horizontal orientation of a pipe and in a wet-line configuration, the impulse line extension directions 80 are offset by 75 degrees below the horizontal plane 84, in other examples, the impulse line extension directions may be offset by any angle between 10 and 80 degrees below the horizontal plane. In some examples, the impulse line extension directions may be offset by more than 45 degrees below the horizontal in this orientation so that they have a larger downward component when the flow restrictor pipe section is in the horizontal orientation. The horizontal orientation of a pipe is most common, and it may be advantageous for the impulse line extension directions to have a greater downward component in this orientation to minimise installed space and snag risk.

In further examples, the manifold may be configured so that when fixed to the flow restrictor pipe section in either the horizontal or vertical orientation in a wet-line configuration, at least one impulse line extension direction from a high pressure outlet port and a low pressure outlet port are angled by 10 degrees below a horizontal plane.

Offsetting the impulse line extension directions by 45 degrees relative the horizontal may be considered to result in a versatile manifold as the flow restrictor pipe section may be rotated by 90 degrees about a radial line of the flow restrictor pipe section, and the angle of the impulse line extension direction remains at 45 degrees below the horizontal, and 45 degrees above the horizontal. However, it has been found that having the impulse line extension directions offset by a larger angle, such as between 60 and 80 degrees below the horizontal plane, makes manufacturing of the manifold 14 simpler. In particular, it has been found that drilling the end portions 59, 63 of the respective channels 58, 62 into the impulse attachment portion 26 is made easier since the body of the impulse attachment portion can be made less wide.

Although example orientations have been described above with respect to rotations of the flow restrictor pipe section and manifold from one orientation to another, it will be appreciated that such description is for the purpose of making the various orientations clear, and there may be no such rotation when configuring a particular pipe section and manifold for use.

The invention claimed is:

1. A differential pressure metering apparatus comprising a manifold for fluidically coupling impulse lines for a differential pressure meter to measurement ports of a flow restrictor pipe section having a longitudinal pipe axis, the manifold comprising:
   a rigid body comprising a base for mounting to the flow restrictor pipe section, and an arm extending from the base to an impulse attachment portion for coupling to two impulse lines;
   a high pressure channel extending through the rigid body from a high pressure inlet port to a high pressure outlet T-junction in the impulse attachment portion, the high pressure outlet T-junction having opposing first and second high pressure outlet ports each defining an impulse line extension direction along which an impulse line extends when connected to the respective port;

a low pressure channel extending through the rigid body from a low pressure inlet port to a low pressure outlet T-junction in the impulse attachment portion, the low pressure outlet T-junction having opposing first and second low pressure outlet ports each defining an impulse line extension direction along which an impulse line extends when connected to the respective port;

whereby the manifold is configured to be mounted to the flow restrictor pipe section in a wet-line configuration:
  when the longitudinal pipe axis of the flow restrictor pipe section extends horizontally; and
  when the longitudinal pipe axis of the flow restrictor pipe section extends vertically;

wherein in the wet-line configuration, the first high pressure outlet port and the first low pressure outlet port define impulse line extension directions having a downward component, and the second high pressure outlet port and the second low pressure outlet port define impulse line extension directions having an upward component.

2. The differential pressure metering apparatus according to claim 1, wherein in the wet-line configuration, one of the first and second high pressure outlet ports and one of the first and second low pressure outlet ports each define a respective impulse line extension direction which is below the horizontal by at least 10 degrees.

3. The differential pressure metering apparatus according to claim 2, wherein the manifold is configured so that, when mounted in the wet-line configuration to the flow restrictor pipe section having the longitudinal pipe axis extending horizontally, one of the first and second high pressure outlet ports and one of the first and second low pressure outlet ports each define a respective impulse line extension direction which is below the horizontal by at least 45 degrees.

4. The differential pressure metering apparatus according to claim 3, wherein the impulse line extension direction is below the horizontal by up to 75 degrees.

5. The differential pressure metering apparatus according to claim 3, wherein the impulse line extension direction is below the horizontal by up to 80 degrees.

6. The differential pressure metering apparatus according to claim 1, wherein the manifold is configured so that the high pressure inlet port and the low pressure inlet port are spaced apart along a manifold axis.

7. The differential pressure metering apparatus according to claim 6, wherein the manifold is configured so that one of the first and second high pressure outlet ports and one of the first and second low pressure outlet ports each define a respective impulse line extension direction which is below the horizontal by at least 10 degrees when the manifold axis is horizontal or vertical.

8. The differential pressure metering apparatus according to claim 1, wherein channel lengths between the high pressure inlet port and first high pressure outlet port and between the low pressure inlet port and first low pressure outlet port are equal, and wherein channel lengths between the high pressure inlet port and second high pressure outlet port and between the low pressure inlet port and second low pressure outlet port are equal.

9. The differential pressure metering apparatus according to claim 1, wherein the manifold comprises a first isolation valves configured to selectively isolate the high pressure outlet T-junction from the high pressure inlet port, and a second isolation valve configured to selectively isolate the low pressure outlet T-junction from the low pressure inlet port.

10. The differential pressure metering apparatus according to claim 9, wherein the high pressure channel has a first end portion extending from the first isolation valve to the high pressure outlet T-junction, and the low pressure channel has a second end portion extending from the second isolation valve to the low pressure outlet T-junction, wherein the first and second end portions approach the high pressure and low pressure outlet T-junctions from opposing sides.

11. The differential pressure metering apparatus according to claim 1, wherein the first high pressure and first low pressure outlet ports are side-by-side so that the impulse line extension directions of the first high pressure outlet port and the first low pressure outlet port are parallel to one another, and wherein the second high pressure and second low pressure outlet ports are side-by-side so that the impulse line extension directions of the second high pressure outlet port and the second low pressure outlet port are parallel to one another.

12. The differential pressure metering apparatus according to claim 1, wherein the manifold is configured so that when the manifold is mounted to the flow restrictor pipe section in a first installation orientation in which the flow restrictor pipe section has the longitudinal pipe axis extending vertically or horizontally, and the first high pressure outlet port and the first low pressure outlet port define impulse line extension directions having a downward component, rotation of both the flow restrictor pipe section and the manifold together about a horizontally extending radial axis of the flow restrictor pipe section by 180 degrees to a second installation orientation causes the second high pressure outlet port and the second low pressure outlet port to define impulse line extension directions having a downward component.

13. The differential pressure metering apparatus according to claim 1, wherein the first and second high pressure outlet ports and the first and second low pressure outlet ports are threaded.

14. The differential pressure metering apparatus according to claim 1, comprising plugs configured to close one of the first and second high pressure outlet ports and one of the first and second low pressure outlet ports respectively.

15. The differential pressure metering apparatus according to claim 1, wherein the manifold is further configured to be mounted in a dry-line configuration to the flow restrictor pipe section with the longitudinal pipe axis extending horizontally, such that the impulse line extension directions defined by each of the first and second sets of high pressure and low pressure outlet ports have an upward component.

16. The differential pressure metering apparatus according to claim 15, wherein each of the first and second high pressure and low pressure outlet ports are configured so that, when the manifold is coupled to the flow restrictor pipe section in the dry-line configuration, the respective impulse line extension direction is angularly offset relative the longitudinal pipe axis by at least 5 degrees away from the flow restrictor pipe section.

17. The differential pressure metering apparatus according to claim 1, further comprising:
  the flow restrictor pipe section comprising a high pressure measurement port and a low pressure measurement port upstream and downstream of the flow restrictor pipe section respectively;
  wherein the manifold is configured to be mounted to the flow restrictor pipe section so that the high pressure inlet port is fluidically coupled to the high pressure measurement port and the low pressure inlet port is fluidically coupled to the low pressure measurement port; and whereby the manifold is configured to be mounted to the flow restrictor pipe section in a wet-line configuration both when the longitudinal pipe axis extends horizontally and when the longitudinal pipe axis extends vertically, wherein in the wet-line configuration, the first high pressure outlet port and the first low pressure outlet port define impulse line extension directions having a downward component, and the second high pressure outlet port and the second low pressure outlet port define impulse line extension directions having an upward component.

* * * * *